United States Patent

Jang

[11] Patent Number: 6,095,450
[45] Date of Patent: Aug. 1, 2000

[54] PIVOT FOR A WINDING DEVICE

[75] Inventor: Sen-Jong Jang, Taichung Hsien, Taiwan

[73] Assignee: Pei Chi Enterprise Co., Ltd., Taichung Hsien, Taiwan

[21] Appl. No.: 09/246,094

[22] Filed: Feb. 8, 1999

[51] Int. Cl.$^7$ .................................................. B65H 75/38
[52] U.S. Cl. .................................. 242/388.5; 242/388.4; 254/217; 254/223; 254/369; 24/68 CD; 24/71.2
[58] Field of Search ............................... 242/388.5, 388, 242/388.2, 388.3, 388.4; 254/217, 223, 369, 213, 214; 24/68 R, 69 R, 70 R, 70 CT, 70 ST, 69 ST, 71.2, 68 CD, 19

[56] References Cited

U.S. PATENT DOCUMENTS

| | | | |
|---|---|---|---|
| 4,542,883 | 9/1985 | Rutzki | 254/217 |
| 5,282,296 | 2/1994 | Huang | 24/68 CD |
| 5,369,848 | 12/1994 | Huang | 24/68 CD |
| 5,542,798 | 8/1996 | Rawdon et al. | 24/68 CD X |

*Primary Examiner*—Donald P. Walsh
*Assistant Examiner*—William A. Rivera
*Attorney, Agent, or Firm*—Browdy and Neimark, P.L.L.C.

[57] ABSTRACT

A winding device includes a hand crank, a securing substrate plate, and two unidirectional gears pivotally coupled between the hand crank and the substrate plate by a pivot member. A pivot member is inserted, in one operation, through axial holes of pivot mounting portions of the hand crank and the securing substrate plate, and through a semi-circular through holes of the unidirectional gears to pivotally couple the hand crank with the securing substrate plate and unidirectional gears. The pivot member includes two semi-circular pivot portions that are disposed parallel and opposite to each other. Each pivot portion is formed by curling and bending a plate into a semi-circular structure. The pivot portion includes a curved face and two curled portions disposed on an inner side of the curved face. The curled portions have end portions curling in opposite directions and abutting the inner side of the curved face at different points so as to increase the bending strength of the curved face.

1 Claim, 3 Drawing Sheets

FIG. 1
(PRIOR ART)
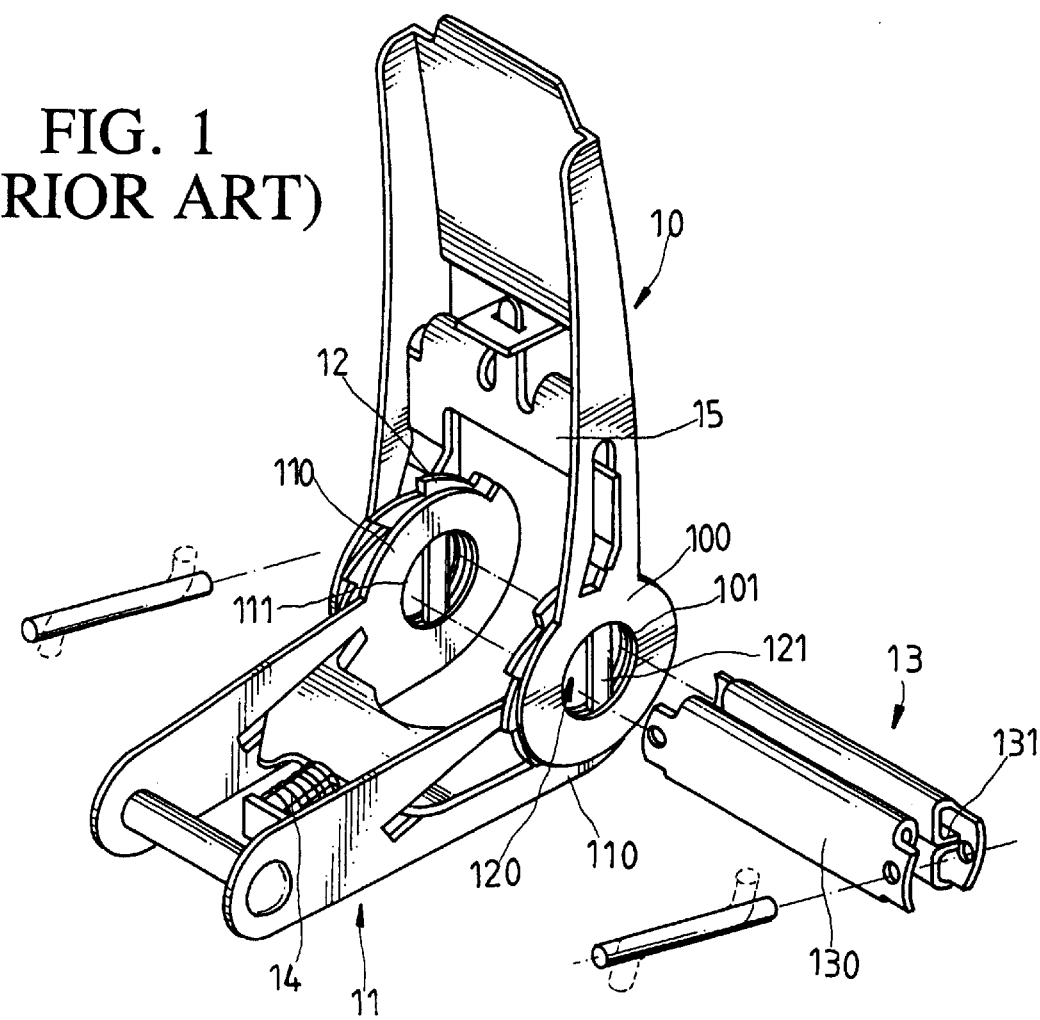
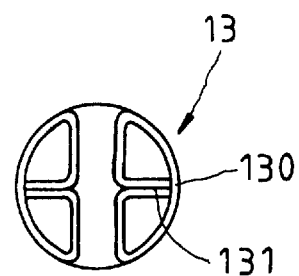
FIG. 2
(PRIOR ART)

PIVOT FOR A WINDING DEVICE

BACKGROUND OF THE INVENTION (a) Field of the Invention

The present invention relates to an auxiliary tool, more particularly to an improved winding device that has a pivot member of enhanced bending strength.

(b) Description of the Prior Art

With reference to FIGS. 1 and 2, a conventional winding device essentially comprises a hand crank 10, a securing substrate plate 11 pivotally connected with the hand crank 10, and two unidirectional gears 12 disposed between the hand crank 10 and the securing substrate plate 11. The securing substrate plate 11 is provided to secure the entire winding device in a firm position in the vicinity at where a rope is determined to be tied. The hand crank 10 is adapted to turn the unidirectional gears 12, and a pivot member 13 is used to draw and tighten the rope. Each of the hand crank 10 and the securing substrate plate 11 is provided with a pair of pivot mounting portions 100, 110 at one end thereof, the respective pair of pivot mounting portions 100, 110 being spaced apart from each other at a certain distance. Each pair of the pivot mounting portions 100, 110 is provided with co-axially aligned axial holes 101, 111. A radial retaining plate 15 is provided at intermediate portions of the hand crank 10 and the securing substrate plate 11 respectively, the retaining plate 15 being subjected to the action of a spring 14 at one end thereof so as to retain the unidirectional gears 12. The portion of the retaining plate 15 on the hand crank 10 can be manipulated manually to control the engagement and disengagement thereof, whereas the portion of the retaining plate 15 on the securing substrate plate 11 is retained in a normal state. Each of the unidirectional gears 12 has a circular axial through hole that is divided by a stop rib 121 into two semi-circular through holes 120. Each of the unidirectional gears 12 is disposed between opposite edges of the hand crank 10 and the securing substrate plate 11 and is sandwiched between the pivot mounting portions 100, 110 on either side. The pivot member 13 includes two semicircular pivot portions that are disposed parallel and opposite to each other. The pivot portions are inserted, in one operation, through the axial holes 101, 111 of the pivot mounting portions 100, 101, and the semi-circular through holes 120 of the unidirectional gears 12 to pivotally connect the hand crank 10, the securing substrate plate 11, and the unidirectional gears 12. Each pivot portion of the pivot member 13 is formed by bending and curling a plate substantially into a semi-circular structure with a cross-section having a curved face 130 and two bent portions 131 that have end portions abutting against each other in a juxtaposed manner. Distal ends of the end portions of the bent portions 131 together abut against the inner side of the curved face 130.

In the conventional winding device as described above, the pivot member 13 is a structural element that is used to bear the tightening force of tightening the rope. Although the pivot member 13 is formed by bending a plate so that it has a cross-section of the above-mentioned shape, which gives the pivot member 13 enhanced structural strength, as the end portions of the bent portions 131 abut against each other in a juxtaposed manner to abut against the inner side of the curved face 130 at one point only, the curved face 130 may easily break along the line of abutment of the bent portions 131 due to insufficient bending strength when being subjected to a large tightening force, thereby resulting in damaging of the strength of the pivot member 13. Worse, still, the pivot portions may break along an axial direction.

SUMMARY OF THE INVENTION

A primary object of the present invention is to provide an improved winding device that has a pivot member of enhanced bending strength. Accordingly, a preferred embodiment of an improved winding device according to the present invention comprises a hand crank, a securing substrate plate, and two unidirectional gears pivotally coupled between the hand crank and the substrate plate by a pivot member. Each of the crank and said securing substrate plate is provided with a pair of pivot mounting portions at one edge thereof which faces that of the other. The pivot mounting portions are spaced apart from each other on both sides of the hand crank and the securing substrate plate, and are provided with co-axial through holes. The unidirectional gears each have a circular axial through hole that is divided by a stop rib into two semi-circular through holes, and are disposed between the pivot mounting holes of the hand crank and the securing substrate plate. The pivot member is inserted, in one operation, through the axial holes of the pivot mounting portions of the hand crank and the securing substrate plate, and through the semi-circular through holes of the unidirectional gears to pivotally couple the hand crank with the securing substrate plate and the unidirectional gears. The pivot member includes two semi-circular pivot portions that are disposed parallel and opposite to each other. Each pivot portion is formed by curling and bending a plate into a semi-circular structure. The pivot portion includes a curved face and two curled portions disposed on an inner side of the curved face. The curled portions have end portions curling in opposite directions and abutting the inner side of the curved face at different points so as to increase the bending strength of the curved face.

BRIEF DESCRIPTION OF THE DRAWINGS

The foregoing and other features and advantages of the present invention will be more clearly understood from the following detailed description and the accompanying drawings, in which, FIG. 1 is a perspective view of a winding device of the prior art;

FIG. 2 is an end view of a pivot member of the winding device of FIG. 1;

DETAILED DESCRIPTION OF THE PREFERRED EMBODIMENT

Figure 3:
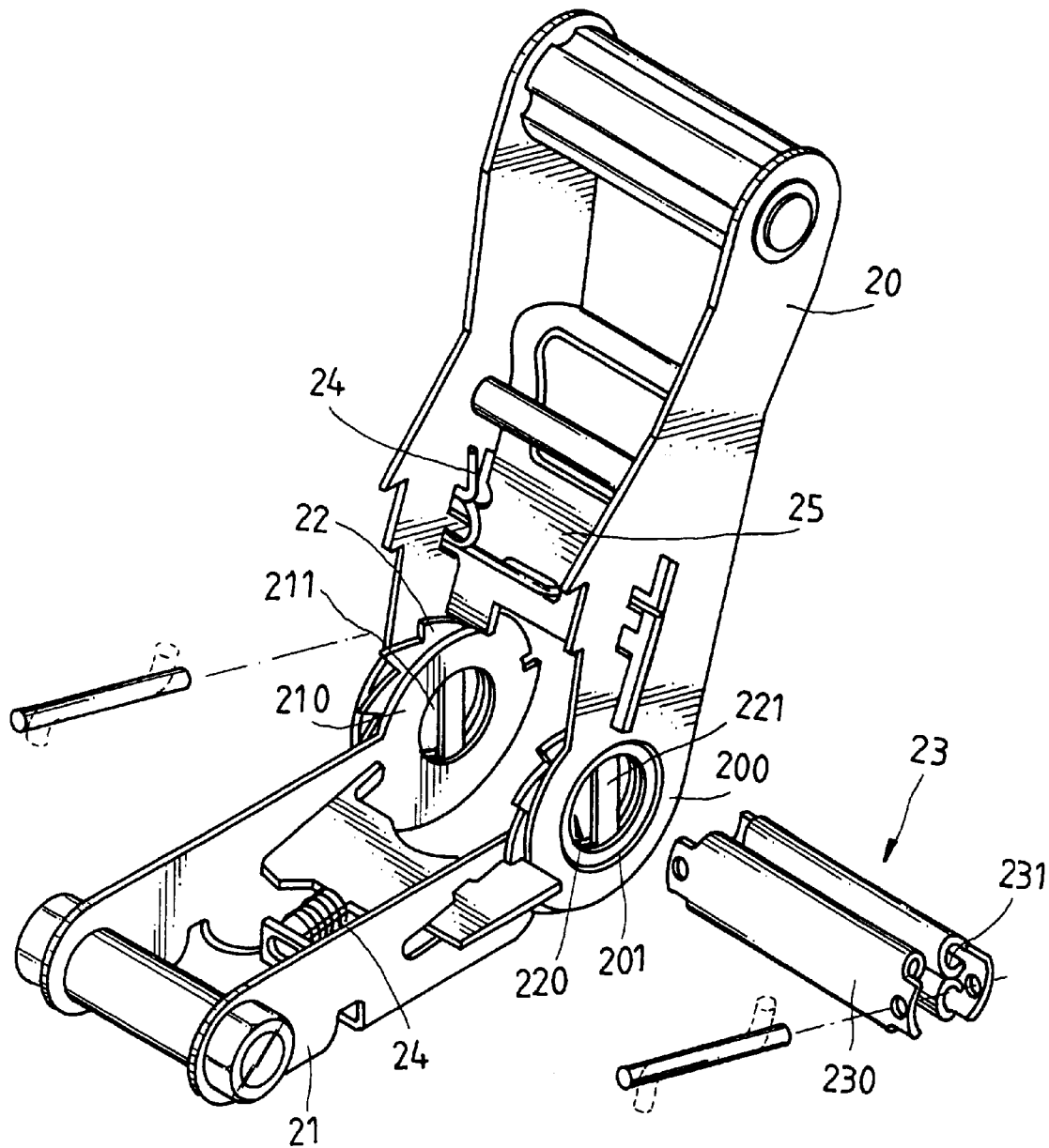
FIG. 3 is a perspective view of a preferred embodiment of a winding device of the present invention.
Figure 4:
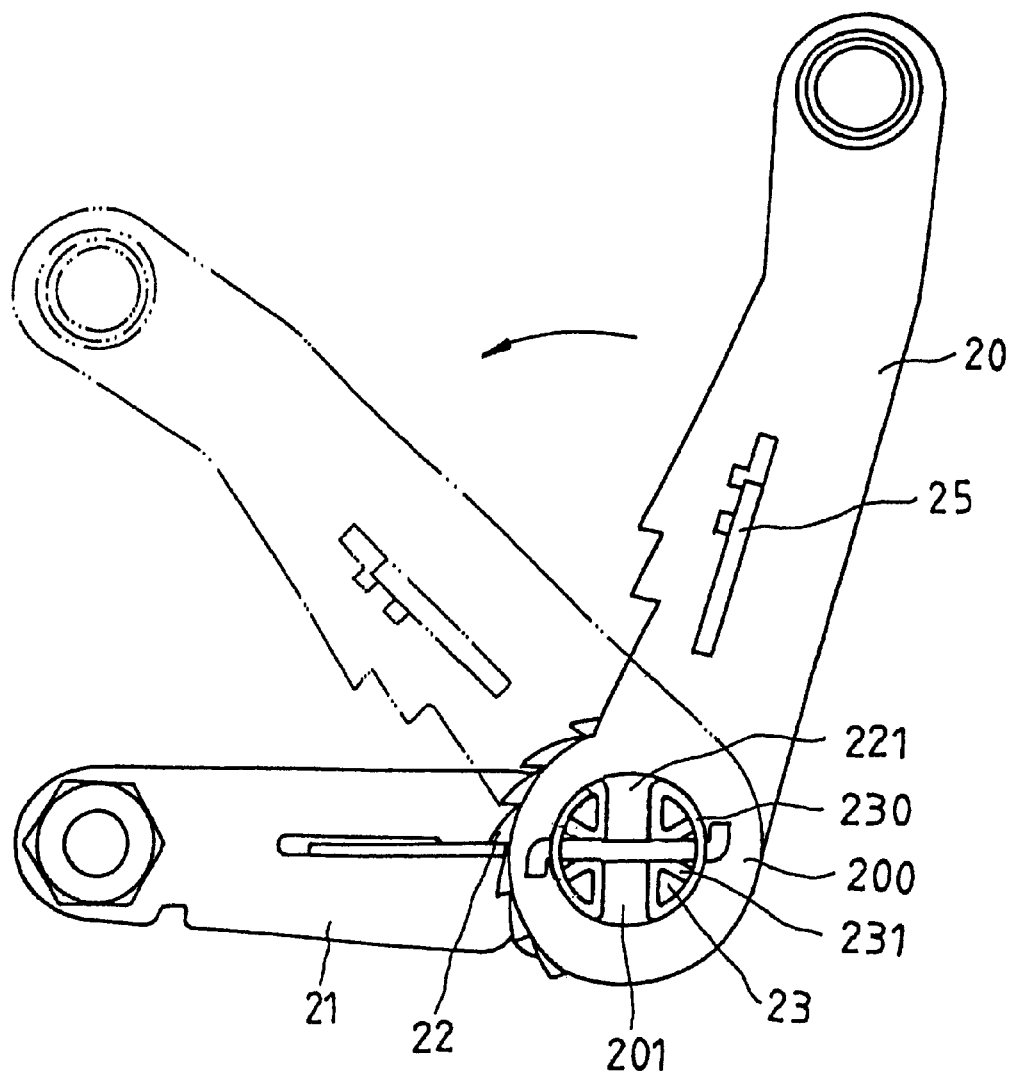
FIG. 4 is a schematic plan view of the preferred embodiment.

With reference to FIGS. 3 and 4, the basic structure of the improved winding device according to the present invention is essentially the same as that of the prior art, comprising a hand crank 20, a securing substrate plate 21 pivotally connected with the hand crank 20, and two unidirectional gears 22 disposed between the hand crank 20 and the securing substrate plate 21. The securing substrate plate 21 is provided to secure the entire winding device in a firm position in the vicinity at where a rope is determined to be tied. The hand crank 20 is adapted to turn the unidirectional gears 22, and a pivot member 23 is used to draw and tighten the rope. Each of the hand crank 20 and the securing substrate plate 21 is provided with a pair of pivot mounting portions 200, 210 at one end thereof, the respective pair of pivot mounting portions 200, 210 being spaced apart from each other at a certain distance. Each pair of the pivot mounting portions 200, 210 is provided with co-axially aligned axial holes 201, 211. A radial retaining plate 25 is provided at intermediate portions of the hand crank 20 and the securing substrate plate 21 respectively, the retaining plate 25 being subjected to the action of a spring 24 at one end thereof so as to retain the unidirectional gears 22. The portion of the retaining plate 25 on the hand crank 20 can be manipulated manually to control the engagement and disengagement thereof, whereas the portion of the retaining plate 25 on the securing substrate plate 21 is retained in a normal state. Each of the unidirectional gears 22 has a circular axial through hole that is divided by a stop rib 221 into two semi-circular through holes 220. Each of the unidirectional gears 22 is disposed between opposite edges of the hand crank 20 and the securing substrate plate 21 and is sandwiched between the pivot mounting portions 200, 210 on either side. The pivot member 23 includes two semi-circular pivot portions that are disposed parallel and opposite to each other. The pivot portions are inserted, in one operation, through the axial holes 201, 211 of the pivot mounting portions 200, 201, and the semi-circular through holes 220 of the unidirectional gears 22 to pivotally connect the hand crank 20, the securing substrate plate 21, and the unidirectional gears 22. Each pivot portion is formed by curling and bending a plate into a semi-circular structure with a cross-section having a curved face 230 and two curled portions 231 disposed on an inner side of the curved face 230. The two curled portions 231 have end portions curling in opposite directions and abutting the inner side of the curved face 230.

In the present invention, the pivot member 23 is a structural element that is used to bear the tightening force of tightening the rope. Although the pivot member 23 is formed by bending and curling a plate, it has a cross-section of the above-mentioned shape, which renders the pivot member 23 enhanced structural strength, as the end portions of the curled portions 231 curl in opposite directions to abut the inner side of the curved face 230 at two points, the abutting force is distributed evenly, so that the bending area of the curled portions 231 with respect to the inner side of the curved face 230 is increased. Therefore, the pivot member 23 can withstand a greater tightening force, and the curved face 230 will not bend due to insufficient bending strength, which may result in damage to the strength of the pivot member 23, or even breaking of the pivot portions into two along an axial direction. It can therefore appreciated that the present invention can effectively solve the problems of the prior art.

Although the present invention has been illustrated and described with reference to the preferred embodiment thereof, it should be understood that it is in no way limited to the details of such embodiment but is capable of numerous modifications within the scope of the appended claims.

What is claimed is:

1. A winding device, comprising a hand crank, a securing substrate plate, and two unidirectional gears pivotally coupled between said hand crank and said securing substrate plate by a pivot member, each of said hand crank and said securing substrate plate being provided with a pair of pivot mounting portions at one edge thereof which faces that of the other, said pivot mounting portions being spaced apart from each other on said edge on both sides of each of said hand crank and said securing substrate plate, and being provided with co-axial through holes, said unidirectional gears each having a circular axial through hole that is divided by a stop rib into two semi-circular through holes, being sandwiched between a respective one of said pivot mounting holes of said hand crank and a respective one of said pivot mounting holes of said securing substrate plate and being disposed between said hand crank and said securing substrate plate, said pivot member being inserted, in one operation, through said axial holes of said pivot mounting portions of said hand crank and of said securing substrate plate, and through said semi-circular through holes of said unidirectional gears to pivotally couple said hand crank with said securing substrate plate and said unidirectional gears, wherein said pivot member includes two semi-circular pivot portions that are disposed parallel and opposite to each other, each pivot portion being formed by curling nd bending a plate into a semi-circular structure with a cross-section shaped having a curved face and two curled portions disposed on an inner side of said curved face, said two curled portions having end portions pointing in opposite directions and abutting the inner side of said curved face at different points so as to increase the bending strength of said curved face.

* * * * *

US006095450C1

(12) REEXAMINATION CERTIFICATE (4754th)
United States Patent
Jang

(10) Number: US 6,095,450 C1
(45) Certificate Issued: Mar. 25, 2003

(54) PIVOT FOR A WINDING DEVICE

(75) Inventor: Sen-Jong Jang, Taichung Hsien (TW)

(73) Assignee: Pei Chi Enterprise Co., Ltd., Taichung Hsien (TW)

Reexamination Request:
No. 90/006,214, Feb. 4, 2002

Reexamination Certificate for:
Patent No.: 6,095,450
Issued: Aug. 1, 2000
Appl. No.: 09/246,094
Filed: Feb. 8, 1999

(51) Int. Cl.$^7$ ............................................... B65H 75/38
(52) U.S. Cl. ........................... 242/388.5; 242/388.4; 254/217; 254/223; 254/369; 24/68 CD
(58) Field of Search ........................... 242/388.5, 388, 242/388.2, 388.3, 388.4; 254/213, 214, 217, 223, 369; 24/68 R, 69 R, 70 R, 70 CT, 70 ST, 69 ST, 68 CD, 1.9

(56) References Cited

FOREIGN PATENT DOCUMENTS

TW            346124          11/1998

OTHER PUBLICATIONS

Taiwanese Utility Model Application No. 86208527 filed May 22, 1997 available for public inspection on Nov. 21, 1998 and an English translation thereof.

*Primary Examiner*—Michael R. Mansen

(57) ABSTRACT

A winding device includes a hand crank, a securing substrate plate, and two unidirectional gears pivotally coupled between the hand crank and the substrate plate by a pivot member. A pivot member is inserted, in one operation, through axial holes of pivot mounting portions of the hand crank and the securing substrate plate, and through a semi-circular through holes of the unidirectional gears to pivotally couple the hand crank with the securing substrate plate and unidirectional gears. The pivot member includes two semi-circular pivot portions that are disposed parallel and opposite to each other. Each pivot portion is formed by curling and bending a plate into a semi-circular structure. The pivot portion includes a curved face and two curled portions disposed on an inner side of the curved face. The curled portions have end portions curling in opposite directions and abutting the inner side of the curved face at different points so as to increase the bending strength of the curved face.

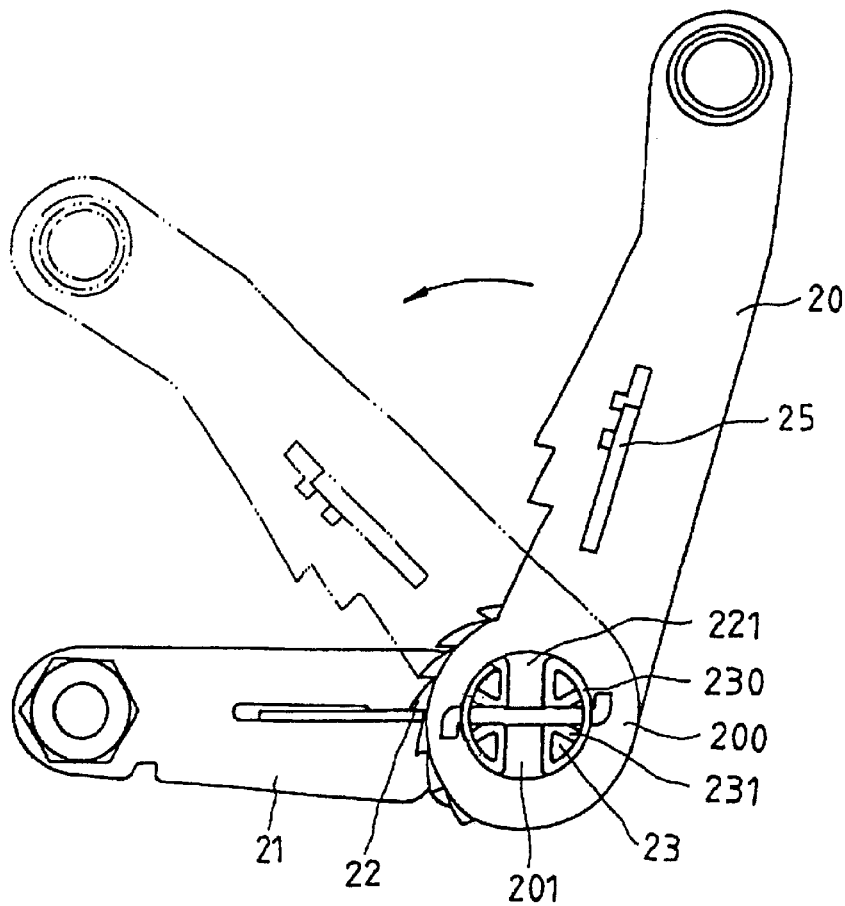

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 1 is cancelled.

* * * * *